Nov. 30, 1965   J. M. VAN VLEET   3,220,032
THREAD CUTTING TAP
Filed April 27, 1962   2 Sheets-Sheet 1

INVENTOR.
JOHN M. VAN VLEET
BY
Wheeler, Wheeler & Wheeler
ATTORNEYS

Nov. 30, 1965          J. M. VAN VLEET          3,220,032
                       THREAD CUTTING TAP

Filed April 27, 1962                          2 Sheets-Sheet 2

INVENTOR.
JOHN M. VAN VLEET
BY
Wheeler, Wheeler & Wheeler
ATTORNEYS

United States Patent Office 3,220,032
Patented Nov. 30, 1965

3,220,032
THREAD CUTTING TAP
John M. Van Vleet, Hartland, Wis., assignor to Balax, Inc., North Lake, Wis., a corporation of Wisconsin
Filed Apr. 27, 1962, Ser. No. 190,609
8 Claims. (Cl. 10—141)

This invention relates to a thread cutting tap.

The present invention seeks to provide taps sufficiently improved so that successively tapped holes will be substantially identical in size and finish, close tolerances being achieved without the use of a lead screw.

To accomplish these results, the present invention contemplates a tap having cutting teeth which have their theoretical apices accurately located on pitch and are symmetrical respecting radii drawn at any point through such apices and on which the cutting forces are geometrically balanced axially of the tap; a tap in which the chip depth is preferably varied between successive teeth; and a tap so constructed that the final shaving of the entire profile of each interdental angle of the work is effected by a single tap tooth in each instance.

In the preferred embodiment herein disclosed, the lead profile is an arc of large radius but any appropriate curved or straight outline is readily produced. The lead is produced in a manner such that the effect is to offset successive teeth bodily in a radial direction. This is in contrast with conventional practice wherein the several teeth have their roots at like radii, their tips being ground off to develop the lead.

Moreover, one of the features of the present tap consists in the location of the theoretical tip or apex of each individual tooth on the exact pitch point of the thread to maintain tooth flank balance and eliminate axial thrust between teeth, the flanks of the teeth being symmetrical angularly with respect to a pitch radius through the theoretical tip of the tooth. Reference is made to the theoretical tip because, in actual practice, no tooth has a sharp apex.

Thus, in the lead portion of the tap, each successive tooth cuts from the sides as well as the bottom of the thread groove in the work throughout the height of the resulting tooth cut in the work.

It is found that a tap made in accordance with the present invention not only cuts threads more accurately than any previously known tap, but is effective with greatly increased tap life.

Figure 1:
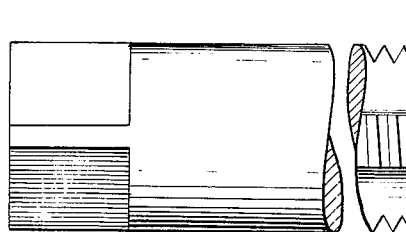
FIG. 1 is a fragmentary plan view of a tap embodying the invention.

Fluted body portion 10 (FIGS. 1 and 2) is provided with lands 11 each of which is provided with a row of thread cutting teeth 12. The crest 13 of each tooth is flattened below the theoretical apex in a plane axially of the tap and transversely of the tooth. The theoretical apex is the point at which the flanks would intersect if extended beyond the rounded or flattened actual crest.

The over-all diameter of the teeth in the lead portion 15 of the tap conventionally increases progressively from the entering end 17 thereof which is first introduced into the bore 18 of the workpiece 20. However, in the prior art the increase in radius involved the tooth crests only, whereas, in the present tap, the teeth are bodily offset radially outwardly. While the crests of the teeth are slightly broader at the entering end, the change in over-all radius does not depend merely on the cutting away the crest as it does in conventional taps.

Figure 2:
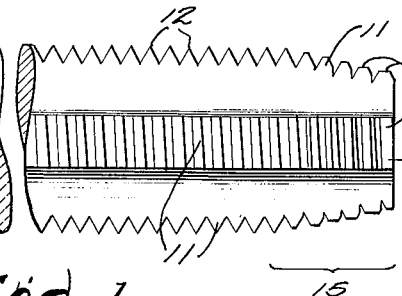
FIG. 2 is a view in end elevation of the tap shown in FIG. 1.
Figure 2:
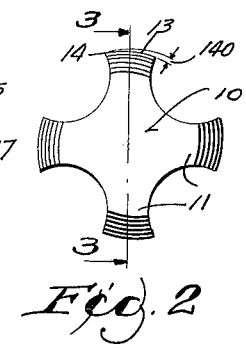
Figure 3:
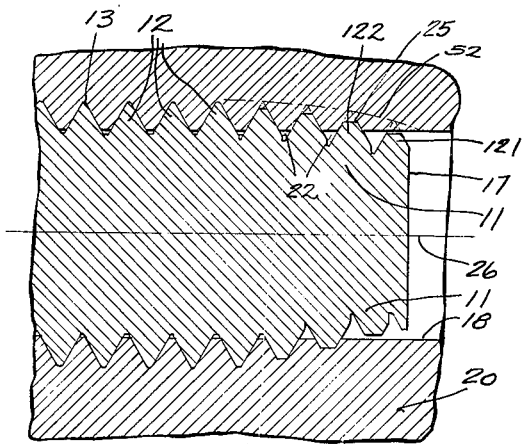
FIG. 3 is an enlarged fragmentary detail view in axial section on line 3—3 of FIG. 2.

It is broadly immaterial to the present invention whether the progressive increase in over-all diameter of the teeth in the lead portion 15 of the tap is effected rectilinearly but it is prferred that the axial profile be on a curve. In FIG. 1 and FIG. 3, the profile is axially curved in accordance with preferred practice. Either type is readily generated in accordance with the present invention.

Figure 3A:
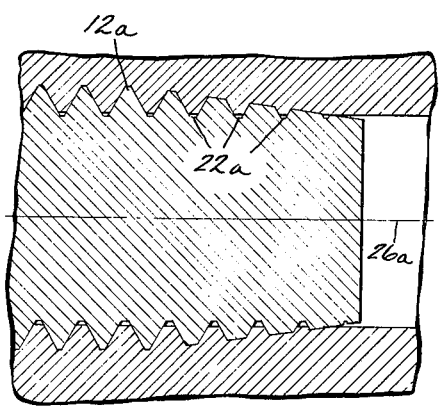
FIG. 3a is a view similar to FIG. 3 showing a prior art tap for purpose of comparison.

FIG. 3 shows the lead portion of a tap embodying the present invention as compared with the showing in FIG. 3a of a conventional tap of the prior art. Near the left in FIG. 3, the first full radius tooth 12 is illustrated. To the left of tooth 12 all the teeth are of like radius both at their theoretical tips and at their theoretical roots. To the right of tooth 12 toward the entering end of the tap, the successive cutting teeth along the lands 11 are bodily displaced in radius toward the axis of the tap so that not only their theoretical tips are at progressively reduced radii but their theoretical roots are also at progressively reduced radii, the grooves or valleys 22 between successive teeth being cut more deeply into the land portion 11 of the tap.

The crests are slightly broadened. It is also true of the teeth at the right of 12a in FIG. 3a that the crests are broadened. However, in the conventional tap shown in FIG. 3a, the theoretical bottoms of the grooves or valleys 22a between the successive cutting teeth are all at the same radius and the difference in elevation or over all radius of the cutting teeth in the lead portion of the tap is brought about by removing the crest portions of the successive teeth to the desired profile. Not alone because each such conventional tooth has flanks 23a and 24a which are of slightly different height, but more particularly because the resulting very blunt outer face 25a is oblique with respect to the axis 26a of the tap, this prior art tooth is asymmetrical. A prior art tap having such teeth is subject to axial back pressure, as indicated by arrow 41a.

In contrast, the flanks of the teeth of my improved tap in the lead portion 15 thereof are at like angles, having side surfaces 23 and 24 at identical angles to the pitch radius 28 and each transverse section of the terminal face 25 being desirably in precise parallelism with the axis 26 and at right angles to the pitch radius.

Figure 5:
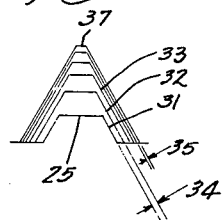
FIG. 5 is a view showing diagrammatically the successive cuts made in fragmentarily illustrated work by the successive teeth of a tap embodying this invention.

Moreover, because of the progressive bodily offset of successive cutting teeth radially of the tap, as clearly appears in FIG. 3, the cutting penetration of the first tooth 121 is narrower than the ultimate width of the groove cut in the work at that radius, being approximately equal in width to the width of the tooth tip 25. The second tooth 122 penetrates a little more deeply and also penetrates the work to a slightly greater width in both directions axially of the tap (laterally of the cut). Each successive tooth which enters the cut is elongated radially and widened axially. At a given tap radius from the tap axis, the width of successive lead section teeth is progressively increased. Thus the pattern of the successive cuts is as shown in FIG. 5, the cut made by one tooth being shown at 31, the cut made by a subsequent tooth at 32 and the cut made by still another subsequent tooth at 33. Every successive tooth removes metal not only from the bottom of the valley between the teeth of the work but from the sides as well.

Figure 5A:
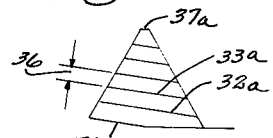
FIG. 5a is a view similar to FIG. 5 showing diagrammatically the successive cuts made by successive teeth of a prior art tap.

For comparison, see the type of cut made by the prior art tap illustrated in FIG. 5a. Due to the manner in which the cutting teeth are formed, as shown in FIG. 3a, the first tooth to penetrate the work will cut to the full ultimate width of the intertooth groove at that level, its cut being shown at 31a in FIG. 5a. A subsequent tooth will produce a cut as indicated at 32a equal to the full width of the groove at its level. The same is true of the subsequent tooth shown at 33a. In consequence, the final cut at 37a will be effective only at the full depth of the groove or valley at the roots of adjacent teeth of the work, whereas the final cut 37 made as shown in FIG. 5 by a tooth embodying the present invention will be a finishing cut which will remove in one operation a continuous chip from the side walls as well as from the bottom of the groove between the teeth of the work.

In accordance with desired practice of the present invention, the teeth nearest the lead end of the tap will cut more deeply into the work to remove a heavier chip than the teeth remote from such end. In effect, these latter teeth will make a finishing cut which, as already stated, will be extremely shallow. Chip control is easily effected in this way. The lateral depth of cut between 31 and 32 (for example) is shown in FIG. 5 at 34 while the greatly reduced lateral depth of the finishing cut is indicated at 35. This contrasts with prior art practice illustrated in FIG. 5a in which no cut widens the groove and all cuts are of uniform radial dimension as indicated at 36.

Figure 4:
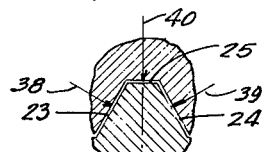
FIG. 4 is an enlarged fragmentary detail view showing a single tooth of a tap embodying this invention as it appears in work cut thereby, the work being fragmentarily illustrated in section.
Figure 4A:
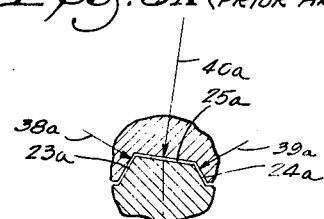
FIG. 4a is a view similar to FIG. 4 showing a tooth of a prior art tap for purposes of comparison.

In addition, each tooth of my improved tap is in axial balance whereas the teeth in the lead portion of conventional taps are not in balance and therefore have to be axially forced into the work. This will be clearly apparent upon comparison of FIG. 4 with FIG. 4a. Because the side surfaces 23 and 24 are at like angles with respect to the pitch radius 28 and because the terminal face 25 (if any) has its transverse section centered with reference to and allochiral with reference to the radius 28, the reaction forces to which the tooth is subject as it enters the work 20 are in balance, as indicated by the equal length of the arrows 38 and 39, and the direction of the arrow 40. In consequence, there is no axial thrust reaction. The pitch of the tap teeth will feed the tap into the work without any requirement for external axial pressure.

Figure 8:
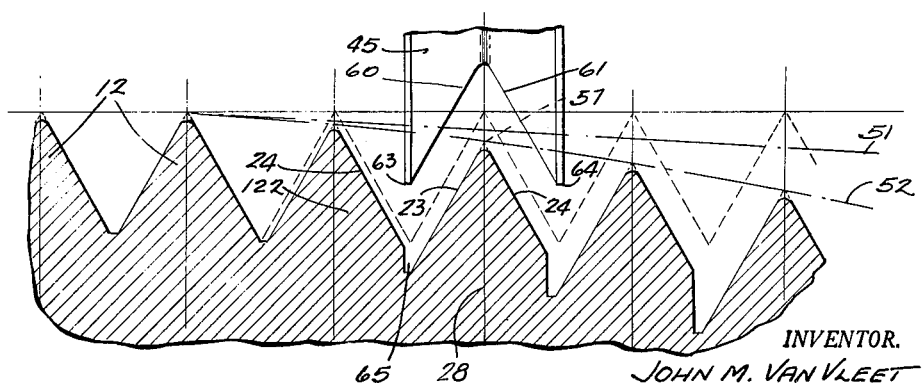
FIG. 8 is a fragmentary diagrammatic view showing a step in a method of manufacturing a tap according to the present invention.

The teeth of my improved tap may be cut with any appropriate tools such as milling tools or abrasive tools. By way of example, I may use a female cutter or wheel having such a cross section as that shown in FIG. 8 where I have illustrated an abrasive wheel 45 peripherally grooved to provide opposed faces 60 and 61 for forming the aforesaid faces 23 and 24 of the respective lead teeth of the tap. The relative movement between the tool 45 and the workpiece from which the tap is being machined will be both helical and radial. The helical movement will correspond to the pitch of the cutting teeth of the tap.

Figure 9:
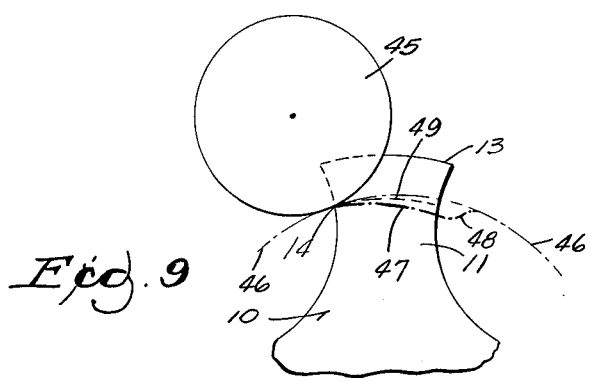
FIG. 9 is a diagrammatic view showing the operation of a forming tool on one flute of a tap in course of construction.

The radial movement will represent an interrupted spiral as shown diagrammatically in FIG. 9. In FIG. 9, only the relative radial movement between the cutting wheel 45 and the workpiece 10 can be illustrated. Since the wheel is cutting a tooth on the lead portion of the tap, which has an axial taper, the wheel must not only move helically according to the pitch of the desired tooth, but it must move radially so that successive teeth will be at progressively increasing radius. However, if the relative movement of the tool were merely a helically spiral movement respecting the workpiece, the teeth would not cut because they would have increasing radius or negative clearance angle, or at least uniform radius, rather than clearance following their respective leading edges. It is necessary that behind the leading edge 14 the tip of each tooth shall either be of progressively decreasing radius as shown at 13 in FIG. 2, for clearance purposes, or at least shall have no increase in radius.

Accordingly, instead of having the tool 45 progress on the helically spiral line indicated at 46 in FIG. 9, the radially outward movement of the tool with respect to the work is arrested in the position in which the tool is shown and thereupon the tool has slight radially inward movement on the path designated at 47 to form the crest 13 in such a way as to provide clearance (if desired) behind the leading edge 14 thereof. Upon clearing the work, the tool moves sharply radially outwardly as indicated by the step 48 and resumes motion on the generally spiral helical path 46. For reference, the dotted line 49 has been included in FIG. 9 to show a fixed radius circle about the axis of the tool.

The relative radial movement will always be on the pitch radius 28 of the helix of the particular tooth which is being cut and the depth of penetration will be whatever depth is required to locate the theoretical apex 57 upon the selected profile 51 or 52 whether this be rectilinear or curved.

It has also been observed above that it is broadly immaterial whether the line 52 connecting the theoretical apices is straight or curved axially of the tap, and it is also broadly immaterial whether the terminal surfaces of the individual teeth are flat or rounded axially. Circumferentially, these surfaces are preferably relieved behind the cutting edge 14 which leads in the indicated direction of rotation, the relief being shown at 140 in FIG. 2.

The marginal apices 63 and 64 of the tool must necessarily penetrate to the root of the particular tooth even though this will require that the margin 63 will penetrate at 65 the side surface 24 of the adjacent tooth (122 in FIG. 9). This is immaterial since the cutting work of the tap is all done with portions of the teeth which are outside of the root area in which this irregularity is formed. As clearly appears in FIG. 3, the root portions of the cutting teeth in the lead section of my improved tap do not enter the workpiece 20. This is in sharp contrast to the operation of prior art taps such as that shown at 3a in which the portions of the teeth of the lead section of the tap which are doing the cutting are at or near the roots of the teeth. The fact that the cutting is done at or near the apices of the teeth in the lead section of my tap, accounts in part for the superior work of my improved tap, since every tooth in the lead section of my tap is progressively widening the cut axially as well as deepening it radially. Thus each cut leaves in the work a freshly cut surface which is continuous from one side of the groove to the other, as distinguished from the surfaces left by the successive operations of a number of different cutting teeth.

In all cases, the tap of the present invention will have the cutting forces geometrically balanced axially, this being a very important factor in producing work of fine quality. Moreover, every cut covers the entire profile. If the theoretical apices of the teeth are finished to a line which is curved as indicated in FIG. 3, the chip depth will progressively be reduced in the lead section of the tap and the final shaving will be removed from the entire profile of the last groove of the lead section in a very fine finishing cut. By varying the radial projection of the several teeth in the lead section, the depth of cut of each such tooth can be predetermined as desired.

Figure 6:
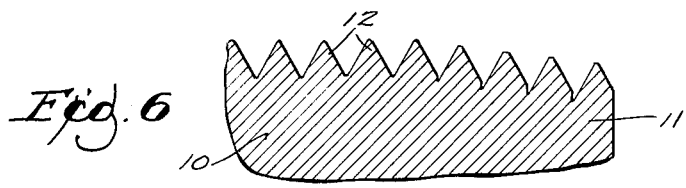
FIG. 6 is a view similar to FIG. 3 showing fragmentarily a modified embodiment of the invention used in brittle work.
Figure 7:
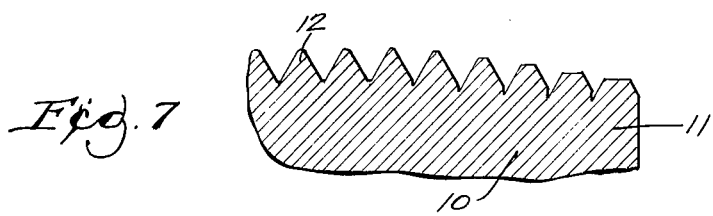
FIG. 7 is a view similar to FIG. 3 showing a further modified embodiment of the invention used in stringy work.

The actual profile of the finished product may be varied as shown by comparing FIG. 3 with FIGS. 6 and 7. FIG. 3 shows a tap for average work. FIG. 6 shows a profile preferred for brittle work. The individual teeth of the lead section have crests closely approximating the theoretical apices. For stringy work, the teeth are very much flattened or blunted as shown in FIG. 7. These considerations do not in any way effect the fact that the theoretical apex of every tooth is exactly on the pitch radius in each axial section and every tooth is geometrically in balance axially of the tap.

By reason of these features, the tap of the present invention has great advantages in superior accuracy of thread cutting and in reduced power requirements.

I claim:

1. A tap having a predetermined axis of rotation and comprising a tapered lead section with teeth having a pitch radius progressively increasing to a substantially cylindrical section having teeth of substantially constant pitch radius, all of said teeth having crest portions which are in pitch continuously throughout said sections and blunted on lines which are allochiral with reference to a radius drawn through the crest, and having flank portions at symmetrical angles respecting on-pitch radii drawn perpendicularly from said axis centrally through respective crest portions, the flank and crest portions of each tooth being in geometrical balance axially of the tap.

2. A tap according to claim 1 in which substantially all of the teeth in the lead section have crests progressively differing in width from the crests of the teeth in the cylindrical section.

3. A tap according to claim 1, having at least one generally longitudinal flute and intervening lands circumferentially spaced and on which said teeth are disposed in interrupted helical pattern and in which the respective teeth of both said sections are provided with cutting relief, the leading end of the crest of each tooth in the lead section having a radius adjacent the leading side of the land on which it is formed exceeding the radius of its trailing end by an amount at least as great as that by which the leading ends of the crests of the teeth of the cylindrical section exceed in radius the trailing ends of said cylindrical section teeth.

4. A tap having a predetermined axis of rotation and comprising a tapered lead section with teeth having a pitch radius progressively increasing to a substantially cylindrical section having teeth of substantially constant pitch radius, all of said teeth having crest portions which are in pitch continuously throughout said sections and blunted on lines which are axially symmetrical with reference to a radius drawn through the crest, and having flank portions at symmetrical angles respecting on-pitch radii drawn perpendicularly from said axis centrally through respective crest portions, the flank and crest portions of each tooth being in geometrical balance axially of the tap, the tap having grooves intervening between its said teeth, such grooves being formed by flank portions of consecutive teeth which portions converge toward the tap axis, the bottoms of the grooves extending between said flank portions outwardly of the theoretical apex toward which such flank portions converge.

5. A tap having a predetermined axis of rotation and comprising a tapered lead section with teeth having a pitch radius progressively increasing to a substantially cylindrical section having teeth of substantially constant pitch radius, all of said teeth having crest portions which are in pitch continuously throughout said sections and blunted on lines which are allochiral with reference to a radius drawn through the crest, and having flank portions at symmetrical angles respecting on-pitch radii drawn perpendicularly from said axis centrally through respective crest portions, the flank and crest portions of each tooth being in geometrical balance axially of the tap, the tap having grooves intervening between its said teeth, such grooves being formed by flank portions of consecutive teeth which portions converge toward the tap axis, the bottoms of the grooves extending between said flank portions outwardly of the theoretical apex toward which such flank portions converge, the respective teeth in the lead section each having one flank portion extending rectilinearly to the bottom of the adjacent groove, the tooth at the other side of such groove having its flank portion terminating radially outwardly from the bottom of the groove portion adjacent thereto.

6. A tap rotatable on its axis for cutting a thread and having a generally cylindrical section and a tapered lead section, both sections comprising a body portion and projecting lands, teeth on the lands having flanks and crests which are uniformly in pitch throughout both sections and which have on each land cutting and trailing edges, the flanks of each tooth converging outwardly toward a theoretical apex and the crests of each being blunt at a radius less than that of said apex and having a width axially between the flanks on a line which is allochiral with reference to a radius drawn through the respective crest and hence in axial balance, the teeth on successive lands in the lead section having cutting edges on a spiral path of progressively increasing radius and helical advance on pitch, and at least the crests of said teeth having on each land radial relief from the cutting edge to the trailing edge, the flanks having radius no greater throughout the land than the radius of corresponding flank portions at the leading edge.

7. A tap rotatable on its axis for cutting a thread and having a generally cylindrical section and a tapered lead section, both sections comprising a body portion and projecting lands, teeth on the lands having flanks and crests which are uniformly in pitch throughout both sections and which have on each land cutting and trailing edges, the flanks of each tooth converging outwardly toward a theoretical apex and the crests of each being blunt at a radius less than that of said apex and having a width axially between the flanks on a line which is allochiral with reference to a radius drawn through the respective crest and hence in axial balance, the teeth on successive lands in the lead section having cutting edges on a spiral path of progressively increasing radius and helical advance on pitch, and at least the crests of said teeth having on each land radial relief from the cutting edge to the trailing edge, the flanks having radius no greater throughout the land than the radius of corresponding flank portions at the leading edge, each tooth on the cylindrical section also having a radial relief from its cutting edge to its trailing edge.

8. A tap rotatable on its axis for cutting a thread and having a generally cylindrical section and a tapered lead section, both sections comprising a body portion and projecting lands, teeth on the lands having flanks and crests which are uniformly in pitch throughout both sections and which have on each land cutting and trailing edges, the flanks of each tooth converging outwardly toward a theoretical apex and the crests of each being blunt at a radius less than that of said apex and having a width axially between the flanks on a line which is allochiral with reference to a radius drawn through the respective crest and hence in axial balance, the teeth on successive lands in the lead section having cutting edges on a spiral path of progressively increasing radius and helical advance on pitch, and at least the crests of said teeth having on each land radial relief from the cutting edge to the trailing edge, the flanks having radius no greater throughout the land than the radius of corresponding flank portions at the leading edge, each tooth on the cylindrical section also having a radial relief from its cutting edge to its trailing edge, the axial profile of the lead section being grooved inwardly of the root apex and the flanks of the teeth of both sections having uniform radial relief.

References Cited by the Examiner

UNITED STATES PATENTS

| | | | |
|---|---|---|---|
| 896,503 | 8/1908 | Zogg | 10—111 |
| 1,447,700 | 3/1923 | Wells | 10—141 |
| 1,543,007 | 6/1925 | Hanson | 10—141 |
| 1,610,087 | 12/1926 | Hanson | 10—141 |
| 2,067,593 | 1/1937 | Benninghoff | 10—111 |
| 2,744,269 | 5/1956 | Kerr et al. | 10—123 |
| 3,021,538 | 2/1962 | Linley | 10—141 |
| 3,125,772 | 3/1964 | Beck | 10—141 |

FOREIGN PATENTS 523,922  4/1955  Italy.

ANDREW R. JUHASZ, *Primary Examiner.*